June 24, 1969  H. TANNENBERGER ET AL  3,451,911

PROCESS FOR THE PRODUCTION OF ISOTOPES

Filed Dec. 1, 1965

INVENTORS
Helmut Tannenberger
Herbert Schachner by
Curtis, Morris & Safford

United States Patent Office 3,451,911
Patented June 24, 1969

3,451,911
PROCESS FOR THE PRODUCTION OF ISOTOPES
Helmut Tannenberger, Geneva, and Herbert Schachner, Le Grand-Lancy, Geneva, Switzerland, assignors to Compagnie Francaise de Raffinage, Paris, France
Filed Dec. 1, 1965, Ser. No. 510,826
Claims priority, application Switzerland, Dec. 2, 1964, 15,515/64
Int. Cl. B01d 59/42, 59/38, 59/00
U.S. Cl. 204—180                                                3 Claims

ABSTRACT OF THE DISCLOSURE

A method has been provided for modifying the ratio of isotopes of oxygen in favor of heavy isotopes. The method comprises the steps of: introducing oxygen consisting of at least two oxygen isotopes of different atomic weights into a cathode chamber of a series of electrolytic cells; ionizing a part of oxygen by electrochemical reduction at a cathode of a cell at a cell working temperature between 600° and 1000° C.; conveying oxygen ions through an electrolyte to an anode of a cell, said electrolyte consisting essentially of zirconium oxide, thorium oxide or hafnium oxide as a base oxide and, as a modifying oxide therefore, an oxide selected from the group consisting of ytterbium oxide, aluminum oxide, calcium oxide, scandium oxide, and yttrium oxide, said electrolyte being permeable to oxygen ions but impermeable to gases in said electrolyte cell; conveying away from the anode of a cell electrochemically oxidized oxygen ions impoverished in heavy isotopes, and collecting at the cathode of the cell, oxygen remaining in a cathode zone enriched in heavy isotopes; repeating the steps above in a plurality of cells by using in the next cell the oxygen collected in said cathode zone of the previous cell and recovering oxygen enriched in a heavier isotope.

---

Figure 1:
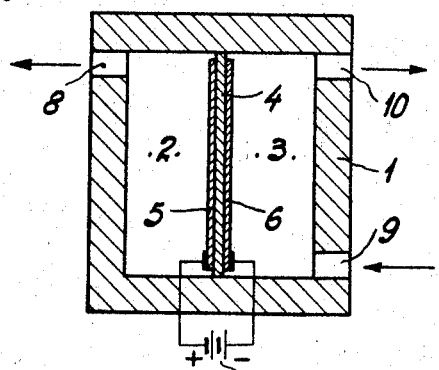

As is well known, oxygen is composed of three isotopes: $O^{16}$, $O^{17}$ and $O^{18}$. The proportion of these isotopes in oxygen contained in air is as follows:

|  | percent |
|---|---|
| $O^{16}$ | 99.759 |
| $O^{17}$ | 0.0374 |
| $O^{18}$ | 0.2039 |

It is also known that oxygen having a high concentration of the heavy isotope $O^{18}$ finds considerable applications as a tracer in research laboratories, especially in chemical, biochemical and biological laboratories. In order to obtain such oxygen, it is therefore necessary to enrich the isotope $O^{18}$ in oxygen of the natural composition indicated above, that is to say to modify the ratio of the isotopes of which it is composed.

The best known and most generally employed method of modifying the ratio of the isotopes in oxygen is that of fractional distillation of water. This distillation can be continued up to complete separation of the heavy isotopes $O^{17}$ and $O^{18}$ from the isotope $O^{16}$. However, this method has a number of disadvantages, of which the most important are a high consumption of energy, which is due to the high heat of evaporation of water, and a very long duration required for putting into equilibrium of the fractionating columns during each start-up of the installation.

The present invention has for its first object a method of modifying the ratio of the isotopes in oxygen, which eliminates the above-mentioned drawbacks.

This method is characterized by the fact that oxygen is caused to pass into the cathode chamber of at least one electrolytic cell, in such manner that a part of this oxygen is ionized and conveyed through the electrolyte into the anode chamber of the cell.

The method according to the invention is based on the difference of the speeds of migration of the ions of the oxygen isotopes in a solid electrolyte, under the effect of an electric field or a concentration gradient. As is will known, the mobility of ions is inversely proportional to the square root of their mass. Thus, the ratio of the speeds of migration of the ions of $O^{16}$ and $O^{18}$ is 1.06.

This method is thus an electro-chemical process which consists of ionizing a part of the oxygen introduced into the cathode chamber of an electrolytic cell, of transporting the ions obtained by means of an ionic conductor impermeable to all gases, and electro-chemically oxidizing these ions in order to obtain oxygen in the anode chamber. By reason of the lower speed of migration of the ions of the heavy isotopes, the oxygen conveyed from the cathode chamber to the anode chamber will be poorer in heavy isotopes than before its conveyance, whereas the oxygen which has not been conveyed will be richer in heavy isotopes than before its introduction into the said chamber. The result is therefore that the ratio of the isotopes in the oxygen passing out of the cathode chamber is modified in favour of the heavy isotopes.

This enrichment obviously depends on the duration of its stay in the cathode chamber and on the intensity of the electric current, that is to say on the quantity of oxygen which has been conveyed into the anode chamber; the greater this quantity, the more the portion remaining in the cathode chamber is enriched in heavy isotopes.

The enriched oxygen collected at the outlet of the cathode chamber of the electrolytic cell can be introduced into the cathode chamber of another cell, while a fresh quantity of oxygen of natural composition is introduced into the first cell. In this way, part of the oxygen enriched in the first cell will be still further enriched in the second. Thus, by passing oxygen into a battery consisting of a number of electrolytic cells in series, it is possible to obtain a high degree of enrichment. It is obviously possible to continue the modification of the ratio of the isotopes in favour of the heavy isotopes up to a concentration of 100% of these latter, that is to say up to complete separation of the isotopes $O^{17}$ and $O^{18}$ from the isotope $O^{16}$.

Knowing the concentration of the isotope $O^{18}$ in the oxygen introduced into the cathode chamber of a cell on the one hand, and the percentage of this oxygen conveyed into the anode chamber on the other, it is possible to calculate the concentration of the isotope $O^{18}$ in the part of the oxygen which passes out of the cathode chamber. Thus, if this percentage is 99.9%, the concentration of the $O^{18}$ will increase from:

0.2% (natural concentration) to 0.3%
50% to 60%
90% to 93%

The invention has also for its object an installation for carrying into effect the method in accordance with the invention.

This installation is characterized by the fact that it comprises a chamber enclosing at least one electrolytic cell, in which the solid electrolyte which is a conductor of oxygen ions and impermeable to gases, forms at least one part of a partition of the main chamber, impermeable to gases and separating the cathode and anode chambers of the cell, this electrolyte being provided on each of its faces with a coating forming one of the two electrodes, cathode and anode, capable respectively of reducing the oxygen electro-chemically and of oxidizing the oxygen ions electro-chemically, the cathode chamber being provided with at least one opening for the inlet and outlet of oxygen, the anode chamber being provided with one or two openings, depending on whether it is an electrolysis cell or a galvanic cell, the said openings being respectively intended for the outlet of the oxygen and the inlet of the fuel and for the outlet of the exhaust gases, appropriate heating means being provided for heating the interior of the main chamber to a desired temperature.

The accompanying drawings show diagrammatically and by way of non-limitative examples, three forms of embodiment of this installation.

Figure 2:
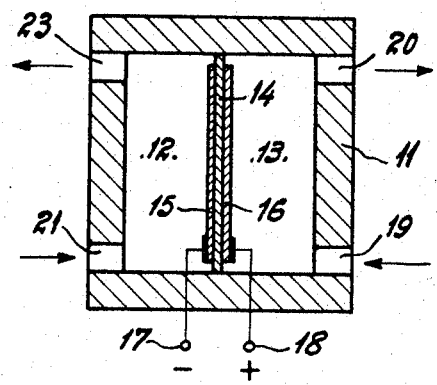
Figure 3:
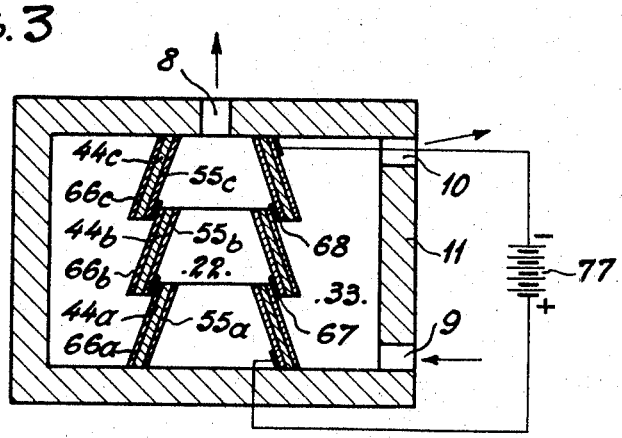

FIGS. 1, 2 and 3 show respectively in longitudinal section, a first, a second and a third form of construction of the installation.

With reference to FIG. 1, the installation which is in fact an electrolysis cell comprises a main chamber 1 separated into two chambers 2 and 3 by a partition 4 formed by a solid electrolyte constituted by:

88% mol. of zirconium oxide ($ZrO_2$)
8% mol. of ytterbium oxide ($Yb_2O_3$)
4% mol. of aluminium oxide ($Al_2O_3$)

The electrolyte 4, the thickness of which in the present case is a few tenths of a millimeter, is coated on each side with a layer of silver having a thickness of a few hundredths of a millimeter, 5 and 6 respectively, forming the anode and the cathode respectively. The anode 5 and the cathode 6 are connected to a source of direct-current voltage 7.

It should be noted that the thickness of the electrolyte 4 and of the electrodes 5 and 6 is shown on a very much larger scale than the remainder of the cell in order to illustrate this more clearly.

The so-called anode chamber 2 is provided at one of its extremities with an opening 8, while the chamber 3, known as the cathode chamber, has an opening at each of its extremities, 9 and 10 respectively.

The installation described functions in the following manner:

In order that the electro-chemical reaction may be produced, the voltage of the source 7 should be as a minimum:

$$V = \frac{RT}{4F} \log \frac{P_1}{P_2} + I \cdot R_{el}$$

in which:

R = the constant of the gas
T = the temperature in ° K.
$P_1$ = the pressure of oxygen in the anode chamber
$P_2$ = the pressure of oxygen in the cathode chamber
F = the Faraday constant
I = the current
$R_{el}$ = the electrical resistance of the cell The working temperature of the cell, which depends on the ionic conductivity of the electrolyte employed and which, depending on the composition of this latter, can vary between 600° and 1000° C., will be about 800° C. in the present case. This temperature is obtained by heating the cell by appropriate heating means, not shown.

After an electrical potential is impressed on the cell, oxygen, of natural composition $O_{2,n}$ for example, is introduced into the cathode chamber 3 through the opening 9. After the electro-chemical reduction of a part of the oxygen, due to the cathode 6, the ionized oxygen is conveyed by the electrolyte 4 to the anode 5, at which the ions are electro-chemically oxidized. By reason of the difference of the speeds of migration of the ions of the isotopes forming $O_{2,n}$, there is obtained in the anode chamber 2 oxygen $O_{2,p}$ impoverished in heavy isotopes, so that oxygen $O_{2,r}$ remaining in the cathode chamber becomes enriched in heavy isotopes. This is collected at the outlet 10. Oxygen $O_{2,p}$ obtained in the anode chamber 2 is evacuated through the opening 8.

In the installation described by way of example, the electrolyte is constituted by a mixed oxide with a base of zirconium oxide. It will be understood that additional oxides other than an ytterbium oxide and aluminium oxide may be utilized. Thus, for example, there may be employed calcium oxide, scandium oxide, yttrium oxide or again oxides of rare earths other than ytterbium oxide. It is also possible to utilize other oxides permitting the preparation of a solid electrolyte which is a conductor of oxygen ions and impermeable to gases, such as thorium oxide or hafnium oxide.

The electrodes may also be constituted by metals other than silver, such as for example platinum and palladium. They may also be formed by an oxide such as nickel oxide to which is added lithium oxide, for example.

It should be observed that the chamber 1 may equally well be cylindrical or parallelepiped in shape. The partition constituted by the electrolyte may be in the form of a tube dividing the main chamber into an outer chamber and an inner chamber.

FIG. 2 shows a second form of construction of the installation, in which the electrolytic cell is a galvanic cell or fuel cell. As previously, it comprises a main chamber 11 divided into two chambers 12 and 13 by a partition 14 constituted by a solid electrolyte of the same composition as that used in the first form of construction. On the side of the chamber 13, the electrolyte 14 is coated with a layer of silver 16 forming the cathode, and on the side of the chamber 12 with a layer of nickel 15 forming the anode. The electrodes 15 and 16 are each connected to an output terminal of the cell, 17 and 18 respectively. The chamber 13 comprises an inlet 19 and an outlet 20 for the oxygen. The chamber 12 comprises an inlet 21 for the fuel and an outlet 23 for the exhaust gases.

The installation in this form of construction operates in the following manner:

Oxygen of natural composition $O_{2,n}$ is introduced into the chamber 13 through the opening 19, simultaneously with a gaseous fuel such as, for example, methane, hydrogen, carbon monoxide, etc., passed into the chamber 12 through the opening 21. A part of this oxygen $O_{2,n}$ is ionized and conducted by the electrolyte 14 towards the electrode 15 for the electro-chemical combustion. The non-ionized part of the oxygen $O_{2,r}$ which is thus enriched in heavy isotopes, is collected at the outlet 20.

In the installation employing this form of construction, the anode is made of nickel, but it may be constituted by another metal such as copper, platinum, iron and cobalt.

As will be apparent from the foregoing description, an installation for carrying into effect the method according to the invention may equally well comprise one or a number of electrolysis cells or one or a number of galvanic cells. It may also comprise a combination of two types of cells employed in succession for the various stages of enrichment. The galvanic cells would then form the first stage, into which is introduced oxygen of natural isotope composition, and would supply the electrical energy to the electrolysis cells forming the following stages. It will be understood that each stage may comprise a number of cells in parallel.

FIG. 3 represents a third form of construction of the installation, which makes it possible to work with a relatively low current and a high voltage.

The installation comprises a main chamber 11 divided into two coaxial chambers 22 and 33 by a tubular partition consisting of three frusto-conical sections engaged one inside the other in a fluid-tight manner, each formed by a solid electrolyte, 44a, 44b, and 44c respectively, provided on the outside with a cathode and on the inside with an anode, 66a and 55a, 66b and 55b and 66c and 55c respectively. The anode 55a of the first section and the cathode 66c of the last section are connected to a source of direct current voltage 77. On the other hand, the cathode 66a of the first section and the anode 55b of the second section respectively, the cathode 66b of the second section and the anode 55c of the third section are connected by means of electrically conductive rings, 67 and 68 respectively, the function of which is also to ensure fluid-tightness between the sections. The installation described is thus composed of a battery comprising three electrolysis cells in series having a single cathode chamber and a single anode chamber. It is easy to see that the enrichment in heavy isotopes of the oxygen passing through the cathode chamber 33 will depend on the number of cells in series. The orifices 8–9–10 have the same respective functions as in the example of FIG. 1.

It will be clear that a number of groups could be arranged in parrallel in the same main chamber, each group comprising a number of cells in series as shown in FIG. 3. In addition, the cells in series forming a battery may be galvanic cells.

What we claim is:

1. A method for modifying the ratio of isotopes of oxygen in favor of heavy isotopes, comprising the steps of: introducing oxygen consisting of at least two oxygen isotopes of different atomic weights into a cathode chamber of a series of electrolytic cells; ionizing a part of oxygen by electrochemical reduction at a cathode of a cell at a cell working temperature between 600° and 1000° C.; conveying oxygen ions through an electrolyte to an anode of a cell, said electrolyte consisting essentially of zirconium oxide, thorium oxide or hafnium oxide as a base oxide and, as a modifying oxide therefor, an oxide selected from the group consisting of ytterbium oxide, aluminum oxide, calcium oxide, scandium oxide, and yttrium oxide, said electrolyte being permeable to oxygen ions but impermeable to gases in said electrolyte cell; conveying away from the anode of a cell electrochemically oxidized oxygen ions impoverished in heavy isotopes; and collecting at the cathode of the cell oxygen remaining in a cathode zone enriched in heavy isotopes; repeating the steps above in a plurality of cells by using in the next cell the oxygen collected in said cathode zone of the previous cell and recovering oxygen enriched in a heavier isotope.

2. A process according to claim 1 and wherein the anode and cathode electrodes are selected from the group consisting of silver, palladium, platinum, and nickel oxide in admixture with lithium oxide.

3. A process according to claim 1 and wherein the anode is formed of nickel, copper, platinum, iron, and cobalt.

References Cited

UNITED STATES PATENTS

| 2,913,511 | 11/1959 | Grubb | 136—86 |
| 3,296,030 | 1/1967 | Tragert | 136—86 |
| 3,306,832 | 2/1967 | Lewis et al. | 204—101 |
| 3,316,163 | 4/1967 | Oser | 204—129 |

FOREIGN PATENTS 1,386,878  3/1964  France.

OTHER REFERENCES

Kendall and White, "The Separation of Isotopes by the Migration Method," Proc. Nat. Acad. Sci., vol. X, 1924, p. 458.

JOHN H. MACK, *Primary Examiner.*

A. C. PRESCOTT, *Assistant Examiner.*

U.S. Cl. X.R.

136—86; 204—129, 301